United States Patent
Lian et al.

(10) Patent No.: US 12,483,096 B2
(45) Date of Patent: Nov. 25, 2025

(54) MOTOR SYSTEM AND VEHICLE HAVING THE SAME

(71) Applicant: BYD COMPANY LIMITED, Guangdong (CN)

(72) Inventors: Yubo Lian, Shenzhen (CN); Heping Ling, Shenzhen (CN); Zhen Zhai, Shenzhen (CN); Linlin Zhao, Shenzhen (CN); Linna Liu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 236 days.

(21) Appl. No.: 18/215,719

(22) Filed: Jun. 28, 2023

(65) Prior Publication Data

US 2023/0344313 A1 Oct. 26, 2023

Related U.S. Application Data

(63) Continuation of application No. PCT/CN2022/083937, filed on Mar. 30, 2022.

(30) Foreign Application Priority Data

Mar. 31, 2021 (CN) .......................... 202110351329.2

(51) Int. Cl.
*H02K 9/193* (2006.01)
*H02K 7/00* (2006.01)

(52) U.S. Cl.
CPC ............ *H02K 9/193* (2013.01); *H02K 7/003* (2013.01); *H02K 7/006* (2013.01); *H02K 2209/00* (2013.01)

(58) Field of Classification Search
CPC .......... H02K 9/193; H02K 9/12; H02K 7/003; H02K 7/006; H02K 2209/00
USPC ......................................... 310/52, 54, 58, 59
See application file for complete search history.

(56) References Cited

U.S. PATENT DOCUMENTS

| | | | |
|---|---|---|---|
| 10,272,767 B1 * | 4/2019 | Tang | .......................... F01P 5/10 |
| 2012/0104884 A1 | 5/2012 | Wagner et al. | |
| 2019/0207480 A1 | 7/2019 | Yamaguchi | |

FOREIGN PATENT DOCUMENTS

| | | |
|---|---|---|
| CN | 103843232 A | 6/2014 |
| CN | 104167872 A | 11/2014 |
| CN | 104362800 A | 2/2015 |
| CN | 106208465 A | 12/2016 |
| CN | 108141108 A | 6/2018 |
| CN | 108884930 A | 11/2018 |
| CN | 109563920 A | 4/2019 |

(Continued)

OTHER PUBLICATIONS

International Search Report and Written Opinion for Application No. PCT/CN2022/083937, mailed on Jun. 13, 2022, 11 pages.

*Primary Examiner* — Jose A Gonzalez Quinones
(74) *Attorney, Agent, or Firm* — Sheppard Mullin Richter & Hampton LLP

(57) ABSTRACT

A motor system includes: a motor including: a motor housing, a stator core, a stator winding, and a rotor core, the stator core mounted in the motor housing, the stator winding wound around the stator core, the rotor core rotatably disposed with respect to the stator core, a rotor flow path formed at least in the rotor core, the rotor flow path configured to transport coolant to the stator winding; and a valve configured to control a flow of the rotor flow path.

18 Claims, 8 Drawing Sheets

(56) References Cited

FOREIGN PATENT DOCUMENTS

| | | | | |
|---|---|---|---|---|
| CN | 110224551 A | 9/2019 | | |
| CN | 111884428 A | 11/2020 | | |
| CN | 112092607 A | 12/2020 | | |
| CN | 112152384 A | 12/2020 | | |
| CN | 112448524 A | 3/2021 | | |
| DE | 102012022453 A1 * | 5/2014 | ............... | H02K 1/20 |
| DE | 102018215889 A1 | 3/2020 | | |
| FR | 3030383 A1 * | 6/2016 | ............ | B60K 11/02 |
| JP | H09182375 A * | 7/1997 | | |
| JP | H09182375 A1 | 7/1997 | | |
| JP | 2003102147 A * | 4/2003 | | |
| JP | 2008187831 A | 8/2008 | | |
| JP | 2009118714 A | 5/2009 | | |
| JP | 2013132151 A | 7/2013 | | |
| JP | 2013240125 A * | 11/2013 | | |
| JP | 2014110705 A | 6/2014 | | |
| JP | 2016007106 A | 1/2016 | | |
| JP | 2018170923 A | 11/2018 | | |
| JP | 2020178485 A | 10/2020 | | |
| JP | 2021010289 A | 1/2021 | | |
| WO | 2019240521 A1 | 12/2019 | | |
| WO | 2020254849 A1 | 12/2020 | | |

* cited by examiner

MOTOR SYSTEM AND VEHICLE HAVING THE SAME

CROSS-REFERENCE TO RELATED APPLICATION

This application is a Continuation Application of International Patent Application No. PCT/CN2022/083937, filed on Mar. 30, 2022, which is based on and claims priority to and benefits of Chinese Patent Application No. 202110351329.2, filed on Mar. 31, 2021. The entire content of all of the above-referenced applications is incorporated herein by reference.

FIELD

The present disclosure relates to the technical field of motor cooling, and in particular to a motor system and a vehicle having the same.

BACKGROUND

In the existing oil-cooled motors, two flow paths are utilized to cool the motor. Before the main flow path enters the gearbox, a part of the coolant is branched to the motor housing, and the stator end is cooled through the liquid hole on the motor housing. Another part of the coolant enters the gearbox. After coming out of the gearbox shaft, the gearbox oil passes over the flow path on the rotor support. Rotation of the rotor brings along the transportation of the oil, so that the oil is transported to the stator end, thereby accomplishing cooling of the motor. However, in this way, the rotor has a large energy consumption, which leads to a low efficiency of the motor.

SUMMARY

The present disclosure solves the technical problems mentioned above in the related art. To this end, the present disclosure provides a motor system having a reduced energy consumption of the rotor and improved efficiency of the motor.

The present disclosure further provides a vehicle having the motor system mentioned above.

A motor system according to an embodiment of the present disclosure includes: a motor, including: a motor housing, a stator core, a stator winding and a rotor core, the stator core being mounted in the motor housing, the stator winding being wound around the stator core, the rotor core being rotatably disposed with respect to the stator core, the rotor flow path being formed at least in the rotor core, the rotor flow path configured to transport the coolant to the stator winding; and a valve configured to control the flow of the rotor flow path.

In the motor system according to an embodiment of the present disclosure, the flow of the rotor flow path can be regulated through opening and closing of the valve so that the valve is opened when the rotor flow path needs to cool the motor to ensure that the flow in the rotor flow path is not zero, and the valve is closed when the rotor flow path does not need to cool the motor to ensure that the flow in the rotor flow path is regulated to zero. As such, the energy consumption during the rotation of the rotor is reduced, i.e., the energy consumption of the motor is reduced, thereby optimizing the efficiency of the motor.

According to some embodiments of the present disclosure, the valve is disposed on the motor and on the rotor flow path.

According to some embodiments of the present disclosure, the motor system further includes: a transmission disposed at one end of the motor, the transmission having a transmission flow channel, the transmission flow channel including a first branch flow channel, the valve disposed on the first branch flow channel, the valve liquid inlet hole of the valve in communication with the first branch flow channel, the valve liquid outlet hole of the valve in communication with the rotor flow path, the valve liquid outlet hole in communication with the valve liquid inlet hole.

In an embodiment, the transmission includes: a transmission case, a transmission main shaft and a transmission bearing, an inner ring of the transmission bearing mounted on the transmission main shaft, an outer ring of the transmission bearing mounted on the transmission case, and a second branch flow channel in communication with the transmission bearing in the transmission.

In an embodiment, the second branch flow channel is located at an upstream of the first branch flow channel.

According to some embodiments of the present disclosure, the motor further includes: a magnetic shield and a rotary shaft, the magnetic shield being mounted on the rotary shaft, the valve liquid outlet hole being in communication with a rotary shaft flow channel inside the rotary shaft, a rotary shaft liquid hole in communication with the rotary shaft flow channel being and disposed on the rotary shaft, the magnetic shield having a magnetic shield flow channel that guides the coolant at the rotary shaft liquid hole to the stator winding.

In an embodiment, the magnetic shield flow channel includes: a magnetic shield first flow channel and a magnetic shield second flow channel, the magnetic shield first flow channel being in communication with the rotary shaft flow channel, a rotor flow channel being disposed inside the rotor core, the rotor flow channel being in communication with the magnetic shield first flow channel, an opening at a first end of the magnetic shield second flow channel being in communication with the rotor flow channel and an opening at a second end of the magnetic shield second flow channel facing the stator winding, the rotor flow path including: at least the rotary shaft flow channel, the magnetic shield first flow channel, the rotor flow channel and the magnetic shield second flow channel.

According to some embodiments of the present disclosure, when the motor operates at a low load or a low rotational speed, the valve is closed, and when the motor operates at a high load or a high rotational speed, the valve is intermittently opened.

According to some embodiments of the present disclosure, the motor has a stator flow path inside, the stator flow path being configured to transport the coolant to the stator winding.

In an embodiment, the inner surface of the motor housing is recessed to form a housing flow channel mated with the stator core.

In an embodiment, the inner surface of the motor housing including a liquid spraying hole in communication with the housing flow channel, the coolant in the housing flow channel being transported to the stator winding via the liquid spraying hole, the stator flow path at least including the housing flow channel and the liquid spraying hole.

In an embodiment, the motor further includes: a motor end cap disposed at one end of the motor housing, the motor system further including: a transmission disposed at the end of the motor facing away from the motor end cap, a first end flow channel being formed between the motor housing and the motor end cap, a second end flow channel being formed between the motor housing and the transmission, the first end flow channel and the second end flow channel being both in communication with the housing flow channel and both in communication with the liquid spraying hole, and the stator flow path further including the first end flow channel and the second end flow channel.

According to some embodiments of the present disclosure, the motor further includes: a motor end cap disposed at one end of the motor housing, the motor end cap including a patch panel, the patch panel including a terminal, the patch panel having a patch panel liquid inlet hole, a patch panel liquid outlet hole and a patch panel flow channel communicating the patch panel liquid inlet hole with the patch panel liquid outlet hole, and the patch panel liquid inlet hole being in communication with the stator flow path.

According to some embodiments of the present disclosure, the motor system further includes: a heat exchange device being in communication with the stator flow path and the rotor flow path to exchange heat with the coolant in the stator flow path and the rotor flow path.

In an embodiment, the motor housing includes a motor liquid inlet hole, a heat exchange liquid inlet hole and a heat exchange liquid outlet hole, a first liquid outlet hole, and a second liquid outlet hole, the heat exchange liquid inlet hole and the heat exchange liquid outlet hole being both in communication with the heat exchange device, the first liquid outlet hole and the second liquid outlet hole in communication with the heat exchange liquid outlet hole, the first liquid outlet hole in communication with the stator flow path, the second liquid outlet hole in communication with the rotor flow path, and the motor system further including: a liquid pump pumping the coolant from the motor liquid inlet hole to the heat exchange liquid inlet hole, and the coolant undergoing heat exchange in the heat exchange device before arriving at the heat exchange liquid outlet hole.

According to some embodiments of the present disclosure, the motor housing includes a motor water inlet, a motor water outlet, a heat exchange water inlet and a heat exchange water outlet, the motor water inlet being in communication with the heat exchange water inlet, the motor water outlet being in communication with the heat exchange water outlet, the heat exchange device having a heat exchange water channel inside that is in communication with the heat exchange water inlet and the heat exchange water outlet, and the motor water inlet and the motor water outlet being in communication with an external cooling circuit.

A vehicle according to an embodiment in another aspect of the present disclosure includes a motor system mentioned above.

The vehicle has the same advantages as the motor system mentioned above compared with the related art, and details are not described herein again.

Additional aspects and advantages of the present disclosure will be presented in the following description, some becoming apparent from the following description or being learned from practices of the present disclosure.

Figure 1:
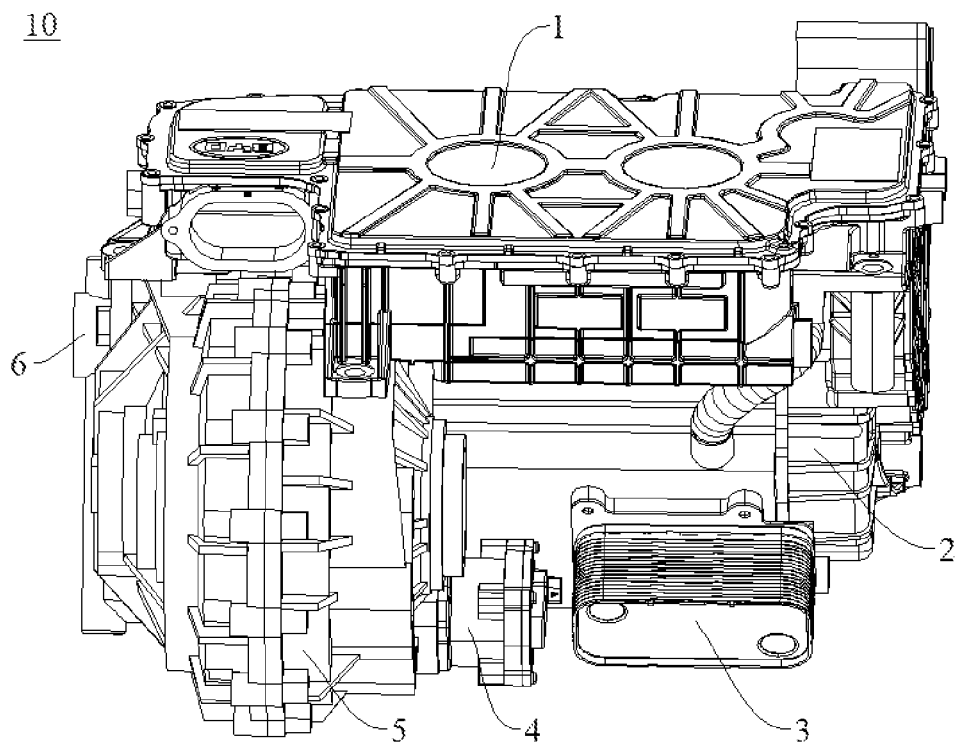
FIG. 1 is a schematic view showing the appearance of a motor system according to an embodiment of the present disclosure.

DESCRIPTIONS OF REFERENCE NUMERALS vehicle 100, motor system 10, electronic control assembly 1, motor 2, motor end cap 21, end cap first flow channel 2101, end cap second flow channel 2102, end cap third flow channel 2103, bottom liquid hole 2104, overflow channel 2105, motor housing 22, motor water inlet 2201, heat exchange water inlet 2202, heat exchange water outlet 2203, motor liquid inlet hole 2204, heat exchange liquid inlet hole 2205, heat exchange liquid outlet hole 2206, second liquid outlet hole 2207, housing flow channel 2208, liquid spraying hole 2209, backflow channel 2210, motor water outlet 2211, first liquid outlet hole 2213, first end flow channel 2214, second end flow channel 2215, stator core 23, stator winding 24, magnetic shield 25, magnetic shield first flow channel 2501, magnetic shield second flow channel 2502, rotor core 26, rotor flow channel 2601, rotary shaft 27, rotary shaft flow channel 2701, rotary shaft liquid hole 2702, motor bearing 28, patch panel 29, patch panel liquid inlet hole 2901, patch panel liquid outlet hole 2902, heat exchange device 3, liquid pump 4, transmission 5, transmission end cap 51, liquid hole 5101, first flow path 5102, second flow path 5103, end cap first liquid hole 5104, end cap second liquid hole 5106, housing body 52, housing liquid hole 5201, second branch flow channel 5202, first branch flow channel 5203, transmission main shaft 53, main shaft flow channel 5301, transmission bearing 54, end cap bearing 55, valve 6, valve liquid inlet hole 601, and valve liquid outlet hole 602.

DETAILED DESCRIPTION

Embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are some examples to explain the present disclosure and shall not be construed as limitation to the present disclosure.

In the description of the present disclosure, it should be understood that orientations or location relationships indicated by the terms "longitudinal", "transverse", "length", "width", "thickness", "upper", "lower", "front", "rear", "left", "right", "vertical", "horizontal", "top", "bottom", "inner", and "outer" are orientations or location relationships shown based on the accompanying drawings merely for the convenience of describing the present disclosure and simplifying the description, but are not used to indicate or imply that a device or an element needs to have a particular orientation or needs to be constructed and operated in a particular orientation, and therefore shall not be understood as limitation of the present disclosure.

In addition, terms "first" and "second" are used merely for the purpose of description and shall not be construed as indicating or implying relative importance or implying a quantity of indicated technical features. Therefore, a feature limited by "first" or "second" may explicitly or implicitly include one or more of the features. In description of the present disclosure, "multiple" means at least two, such as two and three unless it is specifically defined otherwise.

In the present disclosure, unless otherwise explicitly specified or defined, the terms such as "install", "couple", "connect", and "fix" should be understood in a broad sense. For example, the connection may be a fixed connection, a detachable connection, or an integral connection; or the connection may be a mechanical connection or an electrical connection or communication with each other; or the connection may be a direct connection, an indirect connection through an intermediate medium, internal communication between two elements, or an interaction relationship between two elements. A person of ordinary skill in the art may understand the specific meanings of the foregoing terms in the present disclosure according to specific situations.

A motor system 10 and a vehicle according to the embodiments of the present disclosure will be described below with reference to FIG. 1 to FIG. 16.

Referring to FIG. 1, the motor system 10 according to an embodiment of the present disclosure may include: an electronic control assembly 1, a motor 2, and a valve 6.

Figure 2:
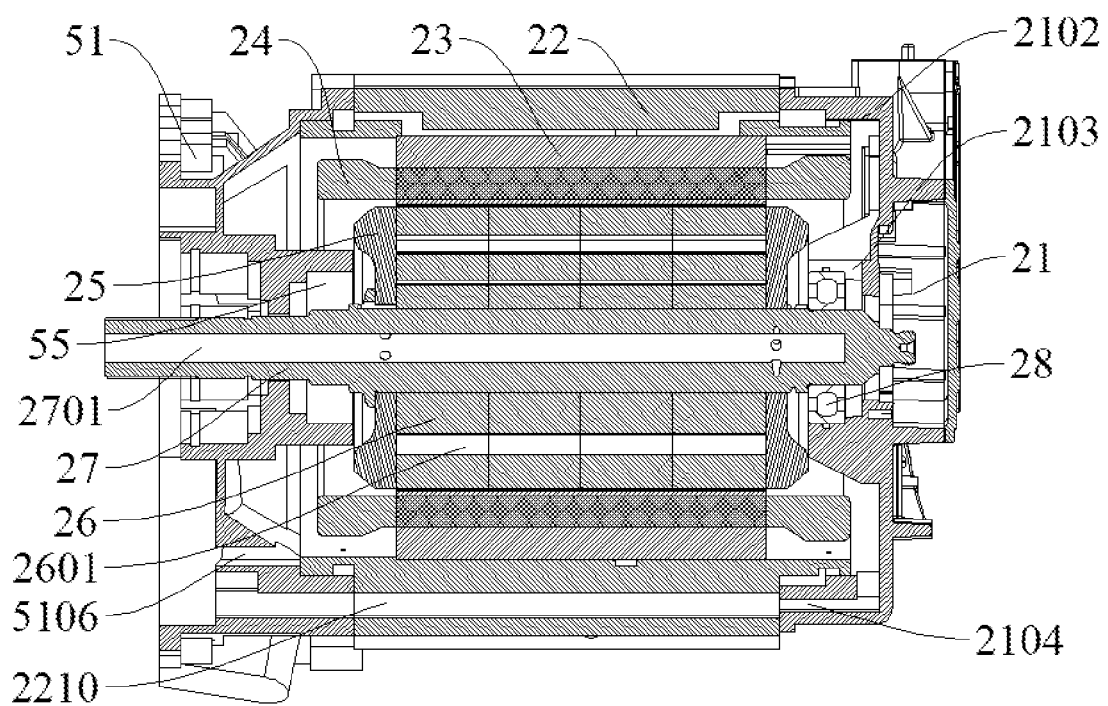
FIG. 2 is a sectional view of a transmission and a motor that are assembled.
Figure 6:
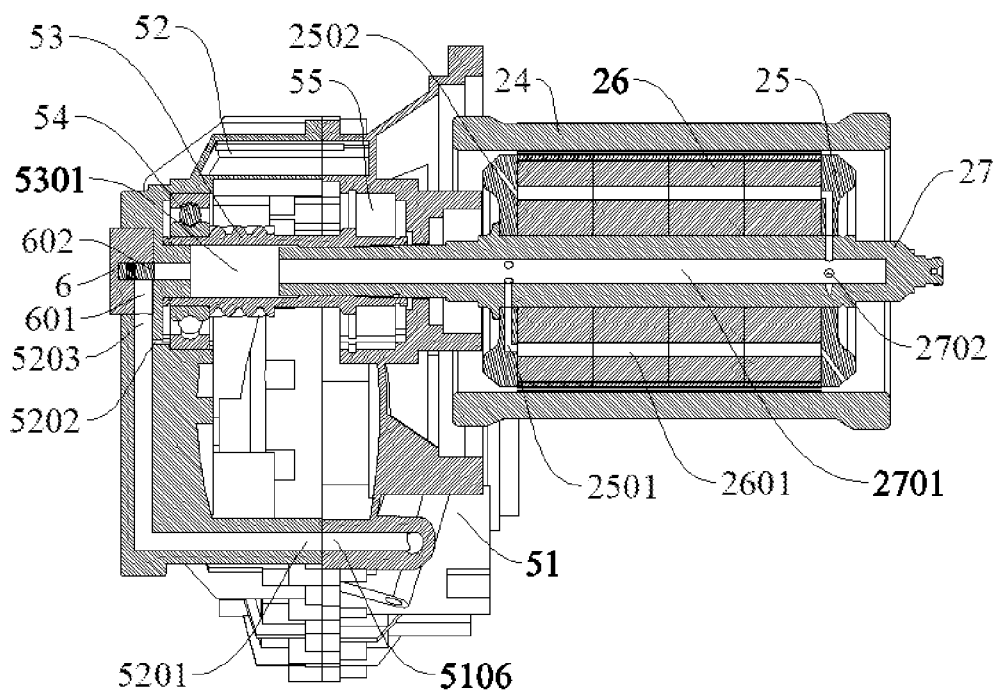
FIG. 6 is a sectional view of a transmission end cap, a housing body, a valve and a motor that are assembled.

The electronic control assembly 1 is mounted on the upper portion of the motor 2. As shown in FIG. 2 and FIG. 6, the motor 2 may include: a motor housing 22, a stator core 23, a stator winding 24, a rotor core 26 and a rotary shaft 27. The stator core 23 is mounted in the motor housing 22. The stator winding 24 is wound around the stator core 23. In an embodiment, the stator winding 24 is inserted into the tooth space of the stator core 23 to form a stator assembly. The stator assembly is mounted in the motor housing 22. The rotor core 26 is arranged/disposed to be rotatable relative to the stator core 23. The rotor core 26 is mounted on the rotary shaft 27. The rotor flow path is formed at least in the rotor core 26. The rotor flow path is configured to transport the coolant to the stator winding 24 so as to cool the stator winding 24. The rotor flow path is further configured to transport the coolant to the rotor core 26 so as to cool the rotor core 26 and other components of the rotor.

The valve 6 is configured to control the flow of the rotor flow path. In an embodiment, when the valve 6 is opened, the flow in the rotor flow path is not zero. At this time, the rotor flow path can transport the coolant to the stator winding 24 to cool the stator winding 24. When the valve 6 is closed, the flow in the rotor flow path is zero. At this time, the rotor flow path cannot transport the coolant to the stator winding 24 to cool the stator winding 24. The opening angle of the valve 6 may be positively correlated to the magnitude of the flow of the rotor flow path. For example, the greater the opening angle of the valve 6, the greater the flow of the rotor flow path. The smaller the opening angle of the valve 6, the smaller the flow of the rotor flow path. In an embodiment, the opening angle of the valve 6 may be positively proportional to the magnitude of the flow of the rotor flow path.

In the motor system 10 according to an embodiment of the present disclosure, the flow of the rotor flow path can be regulated through opening and closing of the valve 6. The valve 6 is opened when the rotor flow path needs to cool the motor 2 to ensure that the flow in the rotor flow path is not zero. The valve 6 is closed when the rotor flow path does not need to cool the motor 2 to ensure that the flow in the rotor flow path is regulated to zero. As such, the energy consumption is reduced during the rotation of the rotor, i.e., the energy consumption of the motor 2 is reduced, thereby optimizing the efficiency of the motor 2.

In some embodiments of the present disclosure, the valve 6 is disposed on the motor 2 and on the rotor flow path.

In an embodiment, the motor system 10 may further include a transmission 5 disposed at one end of the motor 2. In an embodiment, the motor 2 may further include a motor end cap 21 disposed at one end of the motor housing 22. The transmission 5 is disposed at the end of the motor 2 facing away from the motor end cap 21. Referring to FIG. 1 and FIG. 2, the motor end cap 21 is disposed at the right end of the motor 2 and the transmission 5 is disposed at the left end of the motor 2.

In the embodiment shown in FIG. 1 and FIG. 2, the valve 6 is disposed on the transmission 5. At this time, the coolant in the rotor flow path enters via the input shaft in the transmission 5 that is coaxially connected to the rotary shaft 27. In some embodiments not illustrated in the figures, the valve 6 may be disposed on the motor 2. In this case, the coolant in the rotor flow path enters via the end of the rotary shaft 27 away from the transmission 5.

In an embodiment, the transmission 5 may be a speed reducer.

In an embodiment, the transmission 5 has a first branch flow channel 5203 inside. The coolant in the motor housing 22 flows to the first branch flow channel 5203. The valve 6 is disposed on the first branch flow channel 5203. The valve liquid inlet hole 601 of the valve 6 is in communication with the first branch flow channel 5203. The valve liquid outlet hole 602 of the valve 6 is in communication with the rotor flow path. The valve liquid outlet hole 602 is selectively in communication with the valve liquid inlet hole 601.

In an embodiment, as shown in FIG. 6, the transmission 5 may include a transmission case, a transmission main shaft 53 and a transmission bearing 54. The transmission main shaft 53 is coaxially connected to the rotary shaft 27. The inner ring of the transmission bearing 54 is mounted on the transmission main shaft 53. The outer ring of the transmission bearing 54 is mounted on the transmission case. For example, the inner ring of the transmission bearing 54 may be mounted on the transmission main shaft 53 through interference fit. The outer ring of the transmission bearing 54 may be mounted in the transmission case through interference fit. A transmission flow channel is disposed in the transmission case. The transmission flow channel has a second branch flow channel 5202 in communication with the transmission bearing 54. The coolant in the motor housing 22 flows to the second branch flow channel 5202.

The transmission case may include a housing body 52 and a transmission end cap 51. The transmission end cap 51 is mounted on the end portion of the housing body 52. The outer ring of the transmission bearing 54 is fixed to the housing body 52. For example, the outer ring of the transmission bearing 54 is mounted in the housing body 52 through interference fit. The end cap bearing 55 is disposed at the other end of the motor housing 22. The inner ring of the end cap bearing 55 may be mounted on the rotary shaft 27 through interference fit. The outer ring of the end cap bearing 55 may be mounted in the transmission end cap 51 through interference fit. The end cap bearing 55 may be configured to support the rotary shaft 27 so as to ensure stability in rotation of the rotary shaft 27.

Figure 3:
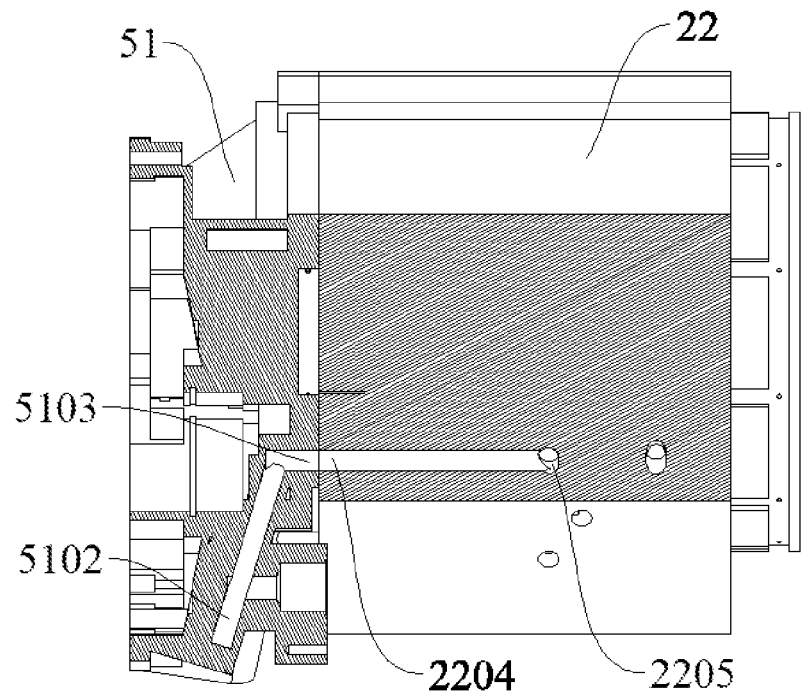
FIG. 3 is a sectional view of a transmission end cap and a motor housing that are assembled.
Figure 13:
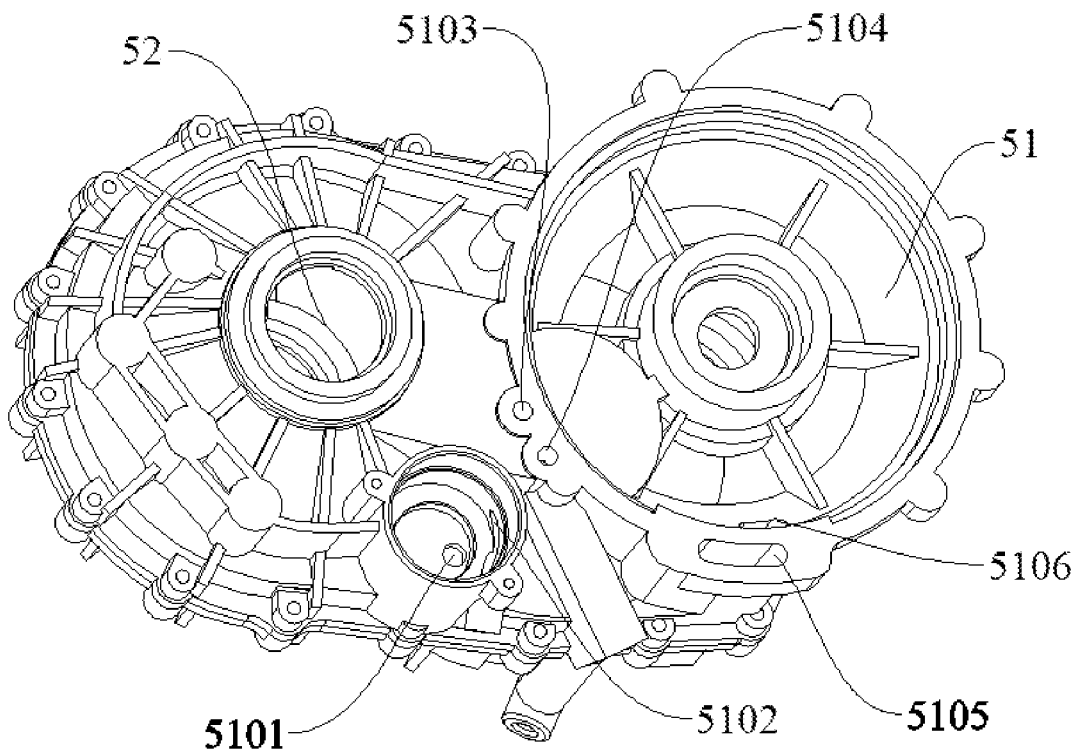
FIG. 13 is a schematic view of a transmission end cap and a housing body that are assembled.
Figure 14:
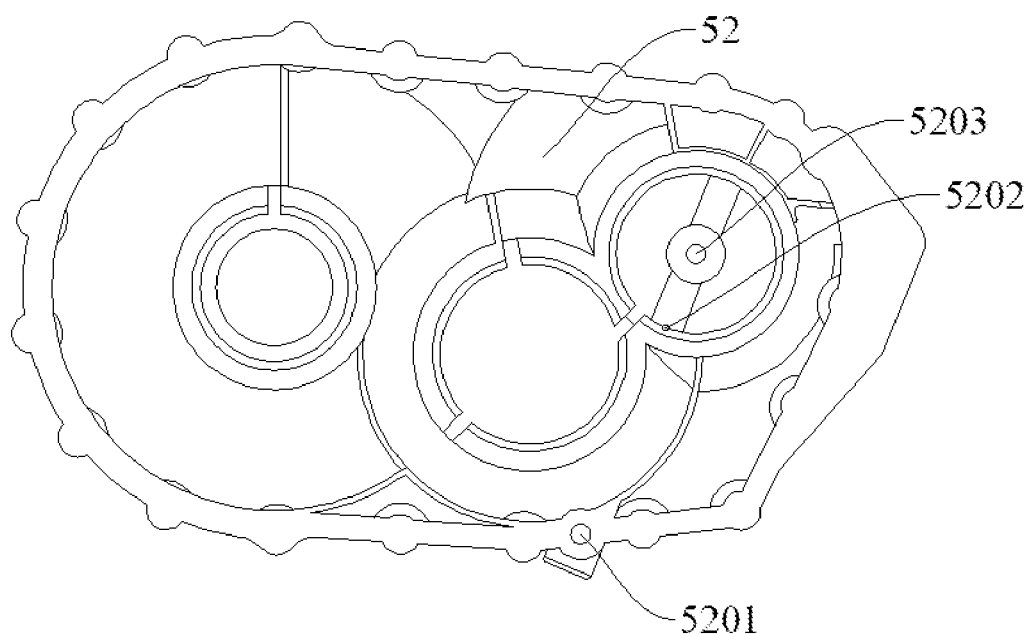
FIG. 14 is a schematic view of a housing body.

Referring to FIG. 3 and FIG. 13, the transmission 5 has a liquid hole 5101, a first flow path 5102 and a second flow path 5103. The liquid hole 5101 is in communication with the first flow path 5102. The first flow path 5102 is in communication with the second flow path 5103. The coolant at the bottom of the transmission 5 is guided to the first flow path 5102 via the liquid hole 5101, then the coolant is guided from the first flow path 5102 to the second flow path 5103 via an internal flow path.

Figure 4:
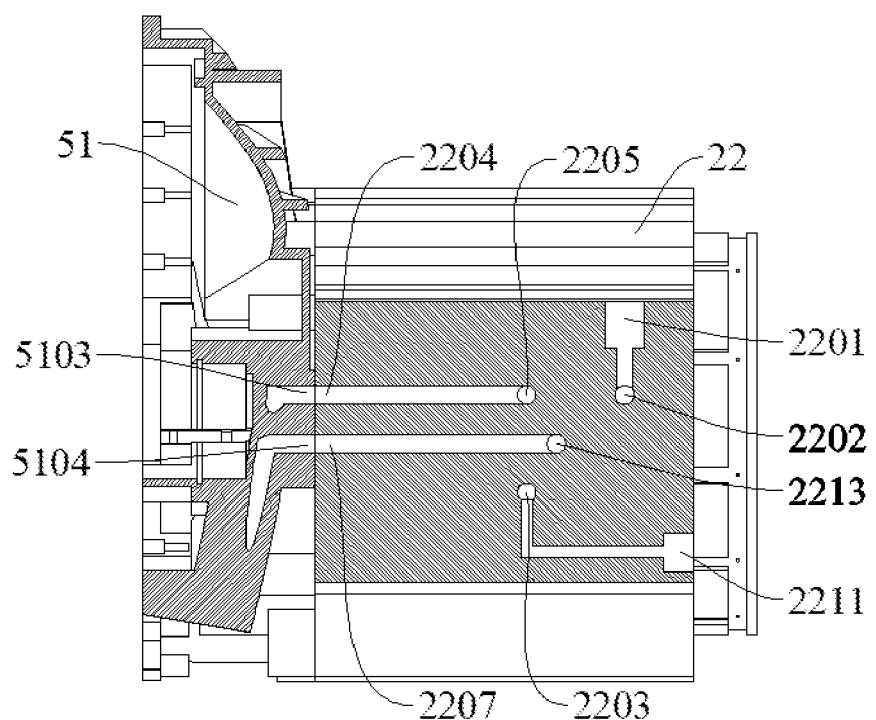
FIG. 4 is a sectional view of a transmission end cap and a motor housing that are assembled according to another embodiment.
Figure 5:
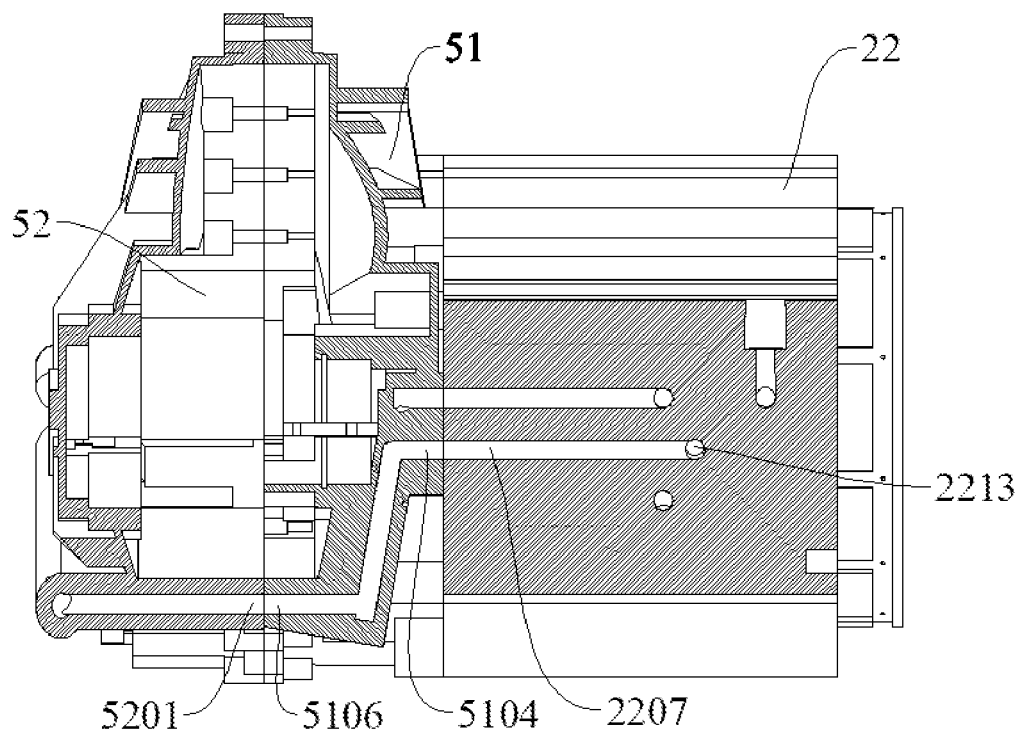
FIG. 5 is a sectional view of a transmission end cap, a housing body and a motor housing that are assembled.

The liquid hole 5101, the first flow path 5102, and the second flow path 5103 may all be disposed in the transmission end cap 51. Referring to FIG. 4 to FIG. 5, an end cap first liquid hole 5104 is further disposed in the transmission end cap 51. The coolant at the end cap first liquid hole 5104 is guided to the end cap second liquid hole 5106 via the internal flow path of the transmission end cap 51. A housing liquid hole 5201 is disposed on the housing body 52. The end cap second liquid hole 5106 is in communication with the housing liquid hole 5201 (e.g., disposed opposite to each other), so that the coolant at the end cap second liquid hole 5106 flows to the housing liquid hole 5201. Referring to FIG. 6, a part of the coolant at the housing liquid hole 5201 flows to the transmission bearing 54 via the second branch flow channel 5202, and another part of this coolant flows to the valve liquid inlet hole 601 via the first branch flow channel 5203. After accomplishing cooling, the oil at one side of the transmission end cap 51 flows from the end cap second liquid hole 5106 to the bottom of the gearbox due to the gravitational effect, thereby accomplishing backflow of the oil.

Referring to FIG. 6, the second branch flow channel 5202 is located at the upstream of the first branch flow channel 5203. That is to say, the coolant passes first through the second branch flow channel 5202 and then through the first branch flow channel 5203. As such, even closing of the valve 6 will not affect the lubrication of the transmission bearing 54.

Referring to FIG. 2 and FIG. 6, the motor 2 may further include a magnetic shield 25 and a motor bearing 28. The magnetic shield 25 is mounted on the rotary shaft 27. The inner ring of the motor bearing 28 is mounted on the rotary shaft 27. The outer ring of the motor bearing 28 is mounted on the motor end cap 21. For example, the inner ring of the motor bearing 28 may be mounted on the rotary shaft 27 through interference fit. The outer ring of the motor bearing 28 may be mounted in the motor end cap 21 through interference fit. The motor bearing 28 supports the rotary shaft 27 and the motor bearing 28 can improve stability in rotation of the rotary shaft 27. Both ends of the rotor core 26 are disposed with a magnetic shield 25. The magnetic shield 25 has the function of magnetic shielding and may be configured to adjust dynamic balance of the rotor assembly (at least including the rotor core 26) of the motor 2.

The motor 2 has a stator flow path inside that is configured to transport the coolant to the stator winding 24 so as to cool the stator winding 24.

As shown in FIG. 2, the motor end cap 21 has an end cap oil chamber that is in communication with the stator flow path. The motor housing 22 has a backflow channel 2210 at the bottom. The oil in the stator flow path flows back to the transmission 5 through the end cap oil chamber and the backflow channel 2210. In an embodiment, the motor end cap 21 has a bottom liquid hole 2104 at the bottom. The bottom liquid hole 2104 is located below the end cap oil chamber and is in communication with the backflow channel 2210. After accomplishing cooling and lubrication, the coolant at one side of the motor end cap 21 flows to the bottom due to the gravitational effect and flows to the backflow channel 2210 via the bottom liquid hole 2104, and then flows back to the bottom of the transmission 5 via the backflow channel.

Figure 9:
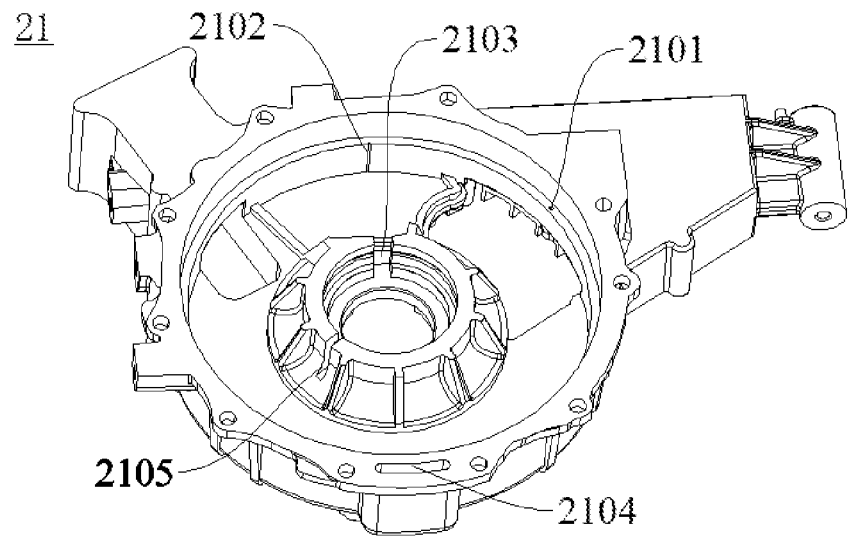
FIG. 9 is a schematic view of a motor end cap.
Figure 10:
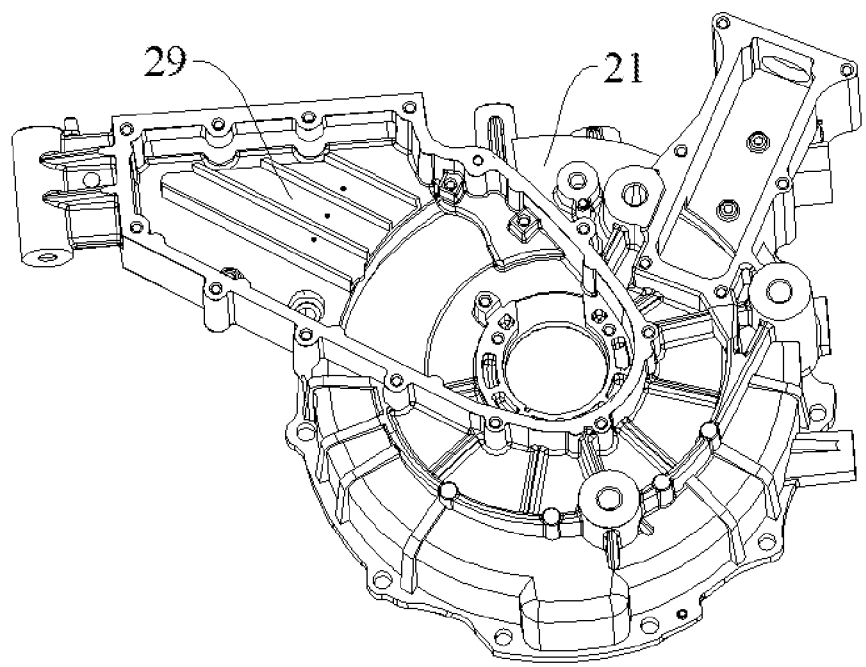
FIG. 10 is a schematic view of a patch panel mounted on a motor end cap.
Figure 11:
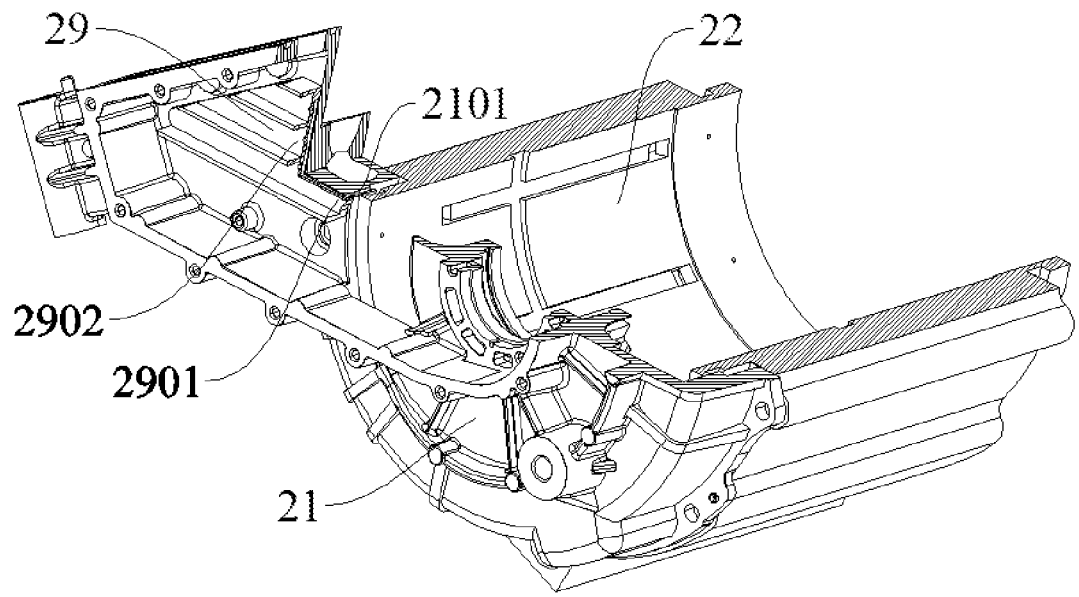
FIG. 11 is a half sectional view of a patch panel and a motor end cap.
Figure 12:
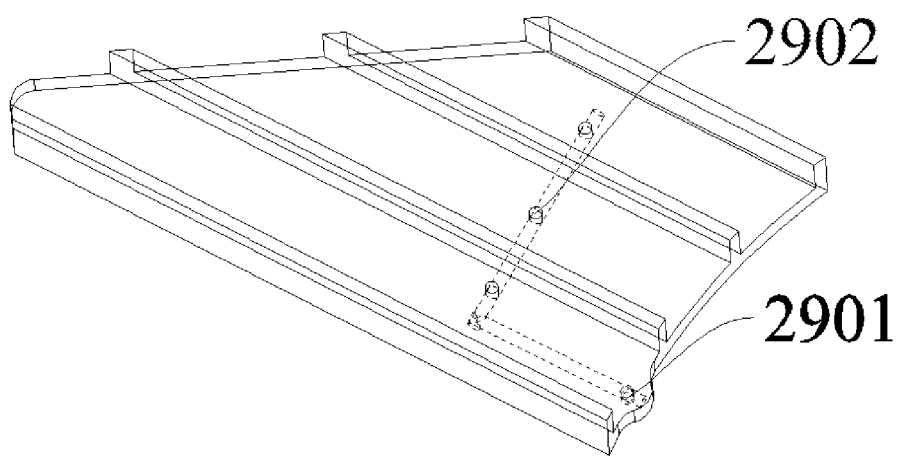
FIG. 12 is a partial schematic view of a patch panel.

In an embodiment, the motor bearing 28 is disposed at the end of the rotary shaft 27 facing the motor end cap 21. As shown in FIG. 2, the motor bearing 28 is disposed at the right end of the rotary shaft 27. The end cap oil chamber communicates the stator flow path with the motor bearing 28. In an embodiment, as shown in FIG. 2 and FIG. 9, the end cap oil chamber includes an end cap second flow channel 2102 and an end cap third flow channel 2103. The end cap second flow channel 2102 is in communication with the end portion of the stator assembly (e.g., disposed directly opposite to each other), so that a part of the coolant at the end portion of the stator assembly is guided out to the end cap oil chamber, then the coolant flows to the end cap third flow channel 2103 along the inner surface of the end cap oil chamber. The end cap third flow channel 2103 is in communication with the motor bearing 28 (e.g., disposed directly opposite to each other), so as to provide lubrication to the motor bearing 28.

Referring to FIG. 9, the motor end cap 21 is further disposed with an overflow channel 2105. The coolant left over from lubrication of the motor bearing 28 flows out through the overflow channel 2105. The height of the position of the overflow channel 2105 is slightly higher than the inner surface of the outer ring of the motor bearing 28. In other words, the height of the position of the overflow channel 2105 is slightly greater than the thickness of the outer ring of the motor bearing 28. As such, once the oil level becomes higher than the inner surface of the outer ring of the motor bearing 28, the oil flows out through the overflow channel 2105. In this way, lubrication of the motor bearing 28 is ensured, and too much coolant at the motor bearing 28 can be avoided, and efficiency can also be taken into account.

Referring to FIG. 9 to FIG. 12, a patch panel 29 is fixedly disposed on the motor end cap 21. The patch panel 29 has a patch panel liquid inlet hole 2901, a patch panel liquid outlet hole 2902 and a patch panel flow channel communicating the patch panel liquid inlet hole 2901 with the patch panel liquid outlet hole 2902. The patch panel liquid inlet hole 2901 is in communication with the stator flow path. The patch panel liquid inlet hole 2901 is in communication with the stator flow path through the end cap oil chamber. In an embodiment, the end cap oil chamber further includes an end cap first flow channel 2101. The coolant in the end cap first flow channel 2101 is guided out through the stator flow path. The patch panel liquid inlet hole 2901 is directly opposite to the end cap first flow channel 2101. The coolant in the end cap first flow channel 2101 flows through the patch panel liquid inlet hole 2901 and then through the patch panel flow channel, and then flows out through the patch panel liquid outlet hole 2902, so as to cool the terminal fixed on the patch panel 29, thereby solving the problem of overheated terminal in high current conditions and consequently eliminating the weakness and improving the overall power density of the motor 2. In this way, the stator flow path can cool the stator core 23, the stator winding 24, the terminal as well as the motor bearing 28 at the same time. The stator flow path is disposed on the motor housing 22 and can be effectively in contact with the stator core 23 so as to cool the stator core 23. Then sealing can be made effectively between the motor housing 22 and the motor end cap 21 (so that the number of parts can be reduced and consequently the NVH performance of the motor system 10 can be improved), and the motor bearing 28 can be lubricated and the terminal can be cooled through the end cap oil chamber.

Figure 7:
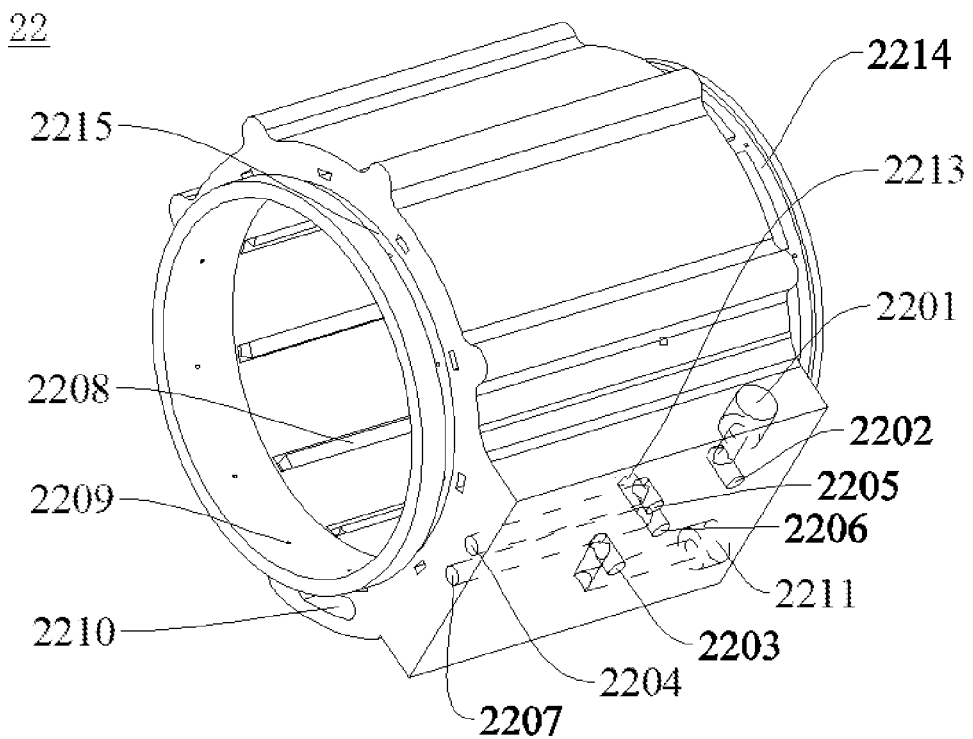
FIG. 7 is a schematic view of a motor housing viewed from one direction.
Figure 8:
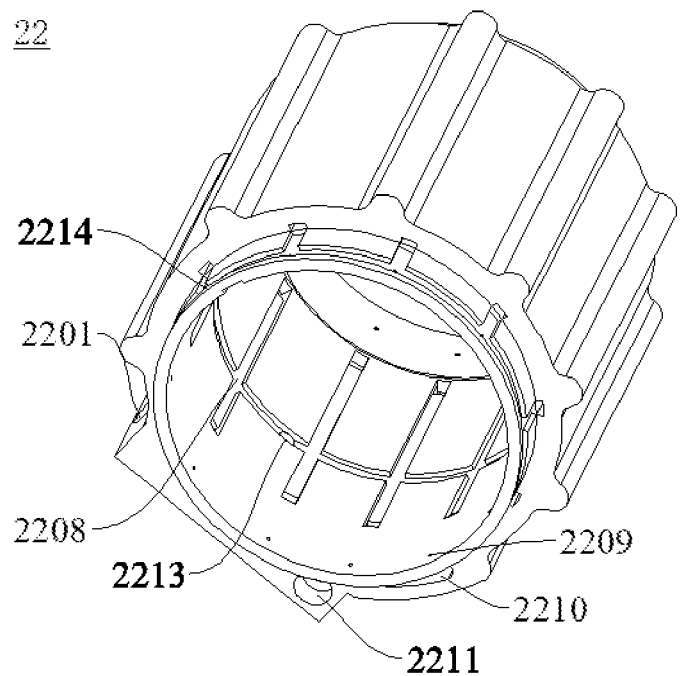
FIG. 8 is a schematic view of the motor housing viewed from another direction.

Referring to FIG. 7 and FIG. 8, the inner surface of the motor housing 22 is recessed and forms a housing flow channel 2208 mated with the stator core 23. The inner surface of the motor housing 22 is disposed with a liquid spraying hole 2209. In an embodiment, the inner surface at both ends of the motor housing 22 is disposed with a liquid spraying hole 2209. The housing flow channel 2208 is in communication with the first liquid outlet hole 2213 and the liquid spraying hole 2209 is in communication with the housing flow channel 2208. The coolant at the first liquid outlet hole 2213 is transported to the stator winding 24 through the housing flow channel 2208 and the liquid spraying hole 2209 and can be specifically transported to the end portion of the stator winding 24 to cool the stator winding 24. The stator flow path at least includes the housing flow channel 2208 and the liquid spraying hole 2209. The liquid spraying hole 2209 may be directly in communication with the housing flow channel 2208 or may be indirectly in communication with the housing flow channel 2208 through other flow path structures (e.g., through the first end flow channel 2214 and the second end flow channel 2215 described below).

In an embodiment, the housing flow channel 2208 is a sealed flow channel formed by the flow path in the inner surface of the motor housing 22 mated with the stator core 23. The housing flow channel 2208 is in direct contact with the stator core 23, which reduces the thermal resistance and improving the heat dissipation efficiency. The housing flow channel 2208 may include a circumferential flow channel and multiple axial parallel flow channels. The multiple axial parallel flow channels are in communication with the circumferential flow channel.

Further In an embodiment, after the motor housing 22 is assembled with the motor end cap 21 and the transmission 5 (for example, by using a seal ring), a first end flow channel 2214 is formed between the motor housing 22 and the motor end cap 21 and a second end flow channel 2215 is formed between the motor housing 22 and the transmission 5. The first end flow channel 2214 and the second end flow channel 2215 are both in communication with the housing flow channel 2208 and also with the liquid spraying hole 2209. In some embodiments, the housing flow channel 2208 is in communication only with the first end flow channel 2214 and the second end flow channel 2215, whereas the first end flow channel 2214 and the second end flow channel 2215 are in communication with the liquid spraying hole 2209. The housing flow channel 2208 and the liquid spraying hole 2209 are in indirect communication through the first end flow channel 2214 and the second end flow channel 2215. The coolant in the first end flow channel 2214 and the second end flow channel 2215 is transported to the end portion of the stator winding 24 via the liquid spraying hole 2209 to cool the stator winding 24. That is to say, the flow channel further includes a first flow channel 2214 and a second flow channel 2215. The housing flow channel 2208 may further be in communication with the liquid spraying hole 2209 through the first end flow channel 2214 and the second end flow channel 2215.

As shown in FIG. 6, the valve liquid outlet hole 602 of the valve 6 is in communication with the main shaft flow channel 5301 inside the transmission main shaft 53. The main shaft flow channel 5301 is in communication with the rotary shaft flow channel 2701 inside the rotary shaft 27. The rotary shaft 27 is further disposed with a rotary shaft liquid hole 2702 that is in communication with the rotary shaft flow channel 2701. The magnetic shield 25 has a magnetic shield flow channel that guides the oil at the rotary shaft liquid hole 2702 to the stator winding 24.

In an embodiment, the magnetic shield flow channel may include a magnetic shield first flow channel 2501 and a magnetic shield second flow channel 2502. The magnetic shield first flow channel 2501 is configured to be in communication with the rotary shaft flow channel 2701. The rotor core 26 has a rotor flow channel 2601 inside. The rotor flow channel 2601 is in communication with the magnetic shield first flow channel 2501. An opening at one end of the magnetic shield second flow channel 2502 is in communication with the rotor flow channel 2601 and an opening at the other end of the magnetic shield second flow channel 2502 faces the stator winding 24. The rotor flow path at least includes a rotary shaft flow channel 2701, a magnetic shield first flow channel 2501, a rotor flow channel 2601 and a magnetic shield second flow channel 2502. The first branch flow channel 5203 is in communication with the rotor flow path. The rotor flow path passes through the rotor core 26 and can cool the rotor core 26 so as to provide better heat dissipation condition for magnet steel.

Referring to FIG. 6, when the valve liquid outlet hole 602 is in communication with the valve liquid inlet hole 601, the coolant in the first branch flow channel 5203 flows from the valve liquid inlet hole 601 to the valve liquid outlet hole 602, then from the valve liquid outlet hole 602 to the main shaft flow channel 5301 and then to the rotary shaft flow channel 2701, and flows through the rotary shaft liquid hole 2702 to the magnetic shield first flow channel 2501 and then to the rotor flow channel 2601, and is finally transported through the magnetic shield second flow channel 2502 to the end portion of the stator winding 24 so as to cool the stator winding 24. In some optional embodiments, the liquid flows through the rotary shaft liquid hole 2702 to the magnetic shield first flow channel 2501 and then directly to the magnetic shield second flow channel 2502, and is then transported to the end portion of the stator winding 24 so as to cool the stator winding 24. At this time, the rotor core 26 may be or may not be disposed with a rotor flow channel 2601 inside.

In an embodiment, the valve liquid outlet hole 602 is intermittently in communication with the valve liquid inlet hole 601. That is to say, the valve 6 is intermittently opened, and when the valve liquid outlet hole 602 is in communication with the valve liquid inlet hole 601, the heat accumulated in the motor 2 can be carried away more quickly to cool the motor 2.

The motor system 10 may further include a heat exchange device 3 mounted on a side surface of the motor 2. The heat exchange device 3 is in communication with the stator flow path and the rotor flow path for heat exchange with the coolant in the stator flow path and the rotor flow path. In an embodiment, the heat exchange device 3 has coolant inside which is at a lowered temperature after heat exchange with the coolant, so that when the coolant is transported to the stator winding 24, the stator winding 24 can be effectively cooled.

After heat exchange by the heat exchange device 3, the coolant enters the stator flow path and the rotor flow path to improve the effect of cooling of the stator winding 24 with the coolant.

Referring to FIG. 7 and FIG. 8, the motor housing 22 is disposed with a motor liquid inlet hole 2204, a heat exchange liquid inlet hole 2205 and a heat exchange liquid outlet hole 2206. The motor liquid inlet hole 2204 is in communication with the heat exchange liquid inlet hole 2205, and the heat exchange liquid inlet hole 2205 and the heat exchange liquid outlet hole 2206 are both in communication with the heat exchange device 3. The motor system 10 may further include a liquid pump 4. As shown in FIG. 1, the liquid pump 4 is mounted on the right-side surface of the transmission 5 and the liquid pump 4 is located near the heat exchange device 3, and the valve 6 is mounted on the left-side surface of the transmission 5, so that the liquid pump 4 and the valve 6 are in reasonable distribution and the space on both sides of the transmission is fully utilized. The liquid pump 4 is configured to pump the coolant in the transmission 5 from the motor liquid inlet hole 2204 to the heat exchange liquid inlet hole 2205. The coolant undergoes heat exchange in the heat exchange device 3 before arriving at the heat exchange liquid outlet hole 2206.

The second flow path 5103 of the transmission 5 is in communication with the motor liquid inlet hole 2204 (e.g., disposed opposite to each other). The coolant goes through the second flow path 5103 and arrives at the motor liquid inlet hole 2204, and then flows through the flow path inside the motor housing 22 to the heat exchange liquid inlet hole 2205, and flows to the heat exchange device 3 via the heat exchange liquid inlet hole 2205. After heat exchange of the coolant with the coolant in the heat exchange device 3, the cooled coolant flows to the heat exchange liquid outlet hole 2206.

The motor housing 22 has a first liquid outlet hole 2213 in communication with the heat exchange liquid outlet hole 2206 and a second liquid outlet hole 2207 in communication with the heat exchange liquid outlet hole 2206. The first liquid outlet hole 2213 is in communication with the stator flow path and the second liquid outlet hole 2207 is in communication with the rotor flow path. That is to say, the coolant that has been cooled in the heat exchange device 3 flows to the heat exchange liquid outlet hole 2206 before being divided inside the motor housing 22 into two branches, one over the stator flow path and the other over the rotor flow path. The valve 6 is disposed on the rotor flow path.

The transmission 5 has a transmission flow channel. The coolant from the second liquid outlet hole 2207 flows to the transmission flow channel.

Referring to FIG. 7, the motor housing 22 is disposed with a motor water inlet 2201, a motor water outlet 2211, a heat exchange water inlet 2202 and a heat exchange water outlet 2203. The motor water inlet 2201 is configured to be in communication with the heat exchange water inlet 2202. The motor water outlet 2211 is configured to be in communication with the heat exchange water outlet 2203. The heat exchange device 3 has a heat exchange water channel inside that is in communication with the heat exchange water inlet 2202 and the heat exchange water outlet 2203. The motor water inlet 2201 and the motor water outlet 2211 are further in communication with an external cooling circuit. In an embodiment, the motor water inlet 2201 is in communication with the water outlet of the electronic control assembly 1 via piping. Communication is enabled between the motor water inlet 2201 and the heat exchange water inlet 2202 by drilling a hole on the motor housing 22. The coolant enters the heat exchange device 3 through the electronic control assembly 1, the motor water inlet 2201 and the heat exchange water inlet 2202, then flows into the heat exchange water outlet 2203 and then into the motor water outlet 2211 through the water channel inside the motor housing 22, and finally to an external cooling circuit. As such, when the coolant from the stator flow path and the rotor flow path are undergoing heat exchange in the heat exchange device 3, heat exchange can be made between this coolant and the coolant inside the heat exchange device 3, so that the coolant can be cooled quickly.

Figure 15:
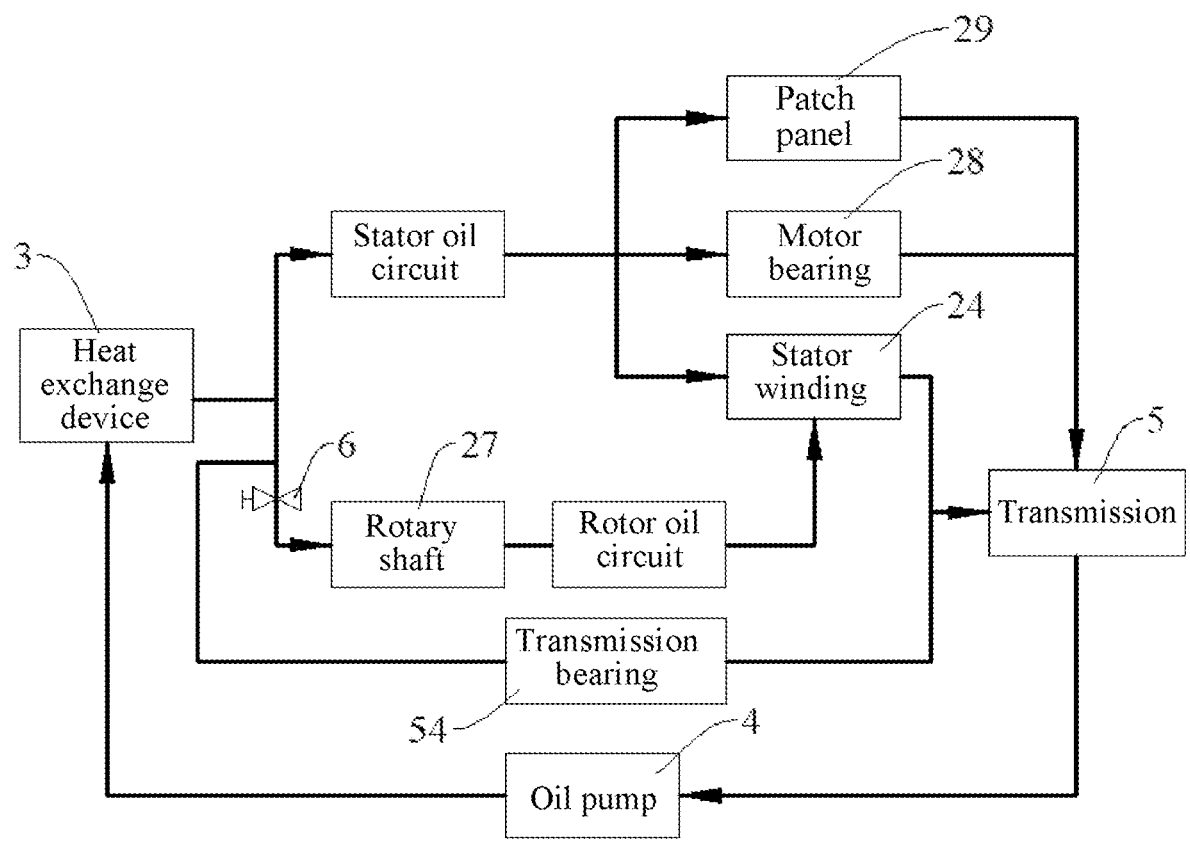
FIG. 15 is a schematic view of a coolant flow path in a motor system.

The flow path of the coolant in the motor system 10 is shown in FIG. 15. Driven by the liquid pump 4, after cooling of the coolant at the bottom of the transmission 5 in the heat exchange device 3, a part of this coolant enters the stator flow path. The coolant in the stator flow path can cool the stator winding 24, the motor bearing 28 and the patch panel 29. When the valve 6 is opened, another part of the coolant that has been cooled by the heat exchange device 3 can enter the rotor flow path and cool the rotor assembly, then be transported to the end portion of the stator winding 24 and flows back to the transmission 5 through the backflow channel 2210 at the bottom of the motor 2 after cooling the stator winding 24.

When the vehicle is parked and the motor 2 operates, the motor 2 operates as the inductor of the battery pack at an increased voltage. The magnitude of the ripple current in the winding is affected by the voltage difference between the charging cabinet and the battery pack. When the voltage difference is greater than a certain threshold, the valve 6 is opened. That is to say, the heat of the motor 2 is harmful at this time, so it is desirable to increase cooling of the motor 2. When a constant direct current applied to the winding of the motor 2 causes the stator winding 24 of the motor 2 to be heated, the rotor flow path does not need to be opened as there is no alternating current. At this time, the valve 6 is closed. That is to say, the amount of the coolant in the rotor flow path is reduced at this time, so that energy consumption in rotation of the rotor is reduced, i.e., energy consumption of the motor 2 is reduced, to improve efficiency of the motor 2.

When the motor 2 operates to drive the vehicle, if the motor 2 operates at a low load/low rotational speed, the valve 6 is closed, and the power of the liquid pump 4 is adjusted according to the temperature of the winding. If the motor 2 operates at a high load/high rotational speed, the power of the liquid pump 4 is adjusted according to the temperature of the winding. The valve 6 is intermittently opened, e.g., it operates for 1 minute at a time interval of 10 minutes, and at the end of the high load and high rotational speed operation, the valve is opened for 1 minute to cool the motor 2, while avoiding the case where the operation is not always at a high load and high rotational speed during the 10-minute interval. In an embodiment, the opening time of the valve 6 may be set according to user demand.

In some embodiments, the low load is a load with a torque less than 50 NM and the high load is a load with a torque greater than or equal to 50 NM. The low speed may be a rotational speed less than 3000 revolutions per minute (RPM) and the high speed may be a rotational speed greater than or equal to 3000 RPM.

The motor system is used in a vehicle. In some embodiments, when the vehicle is parked and powered on, the liquid pump 4 is still operating. In an embodiment, when the vehicle is parked, the motor 2 is not in operation. After power-on of the vehicle, the valve 6 is closed and the liquid pump 4 operates at low power, which can ensure normal lubrication of the transmission bearing 54 and the motor bearing 28. As the vehicle may start at any time, if the transmission bearing 54 and the motor bearing 28 are not lubricated, then the transmission bearing 54 and the motor bearing 28 may be damaged when the vehicle suddenly starts. Therefore, service life of the motor system 10 can be extended if it is ensured that the liquid pump 4 is still operating during the power-on and parking of the vehicle.

Figure 16:
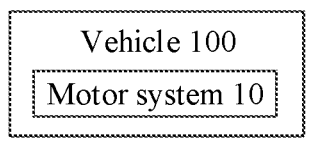
FIG. 16 is a schematic view of a vehicle according to an embodiment of the present disclosure.

Referring to FIG. 16, a vehicle 100 according to an embodiment in another aspect of the present disclosure includes a motor system 10 according to the above embodiment.

The vehicle 100 according to an embodiment of the present disclosure has the following beneficial effects.
  (1) A valve 6 is disposed in the rotor flow path. The flow of the rotor flow path can be adjusted by the valve 6 according to various operating conditions of the motor 2 so as to improve the efficiency of the oil-cooled motor 2 (experiments show that the efficiency of the motor 2 will be decreased when oil passes through the interior of the rotor core 26).
  (2) The motor bearing 28 is lubricated by a part of the coolant guided out of the stator flow path. The transmission bearing 54 is lubricated by a second branch flow channel 5202 guided out upstream of the valve 6 in the rotor flow path. As such, after the valve 6 is closed, lubrication of the transmission bearing 54 will not be affected.
  (3) A part of the coolant is guided out through the stator flow path to cool the patch panel 29, so that the terminal on the patch panel 29 can be cooled. In this way, the problem of overheated terminal in high current conditions is solved, the weakness is eliminated and the overall power density of the motor 2 is improved.

In the description of this specification, the description with reference to the terms "an embodiment", "some embodiments", "example", "specific example", or "some examples" and so on means that specific features, structures, materials or characteristics described in connection with the embodiment or example are embraced in at least one embodiment or example of the present disclosure. In this specification, schematic expressions of the foregoing terms are not necessarily directed to the same embodiment or example. Moreover, the described specific features, structures, materials or characteristics may be combined in a suitable manner in any one or more embodiments or examples. In addition, those skilled in the art can integrate and combine different embodiments or examples described in this specification.

Although the embodiments of the present disclosure have been shown and described above, it can be understood that the above embodiments are exemplary and should not be understood as limitation of the present disclosure. A person of ordinary skill in the art can make changes, modifications, replacements, or variations to the above embodiments within the scope of the present disclosure.

What is claimed is:

1. A motor system, comprising:
  a motor comprising: a motor housing, a motor end cap disposed at one end of the motor housing, a stator core, a stator winding, and a rotor core, the stator core mounted in the motor housing, the stator winding wound around the stator core, the rotor core rotatably disposed with respect to the stator core, a rotor flow path formed at least in the rotor core and configured to transport coolant to the stator winding, a stator flow path disposed in the motor and configured to transport the coolant to the stator winding, the motor end cap comprising a patch panel, the patch panel comprising a terminal, the patch panel having a patch panel liquid inlet hole, a patch panel liquid outlet hole and a patch panel flow channel communicating the patch panel liquid inlet hole with the patch panel liquid outlet hole, and the patch panel liquid inlet hole in communication with the stator flow path; and
  a valve configured to control a flow of the rotor flow path.

2. The motor system according to claim 1, wherein the valve is disposed on the motor and on the rotor flow path.

3. The motor system according to claim 2, further comprising: a transmission disposed at one end of the motor, the transmission having a first branch flow channel, the valve disposed on the first branch flow channel, a valve liquid inlet hole of the valve in communication with the first branch flow channel, a valve liquid outlet hole of the valve in communication with the rotor flow path, and the valve liquid outlet hole in communication with the valve liquid inlet hole.

4. The motor system according to claim 3, wherein the transmission comprises: a transmission case, a transmission main shaft, and a transmission bearing, an inner ring of the transmission bearing mounted on the transmission main shaft, an outer ring of the transmission bearing mounted in the transmission case, and a second branch flow channel in communication with the transmission bearing in the transmission.

5. The motor system according to claim 4, wherein the second branch flow channel is located at an upstream of the first branch flow channel.

6. The motor system according to claim 3, wherein the motor further comprises: a magnetic shield and a rotary shaft, the magnetic shield mounted on the rotary shaft, the valve liquid outlet hole in communication with a rotary shaft flow channel inside the rotary shaft, a rotary shaft liquid hole in communication with the rotary shaft flow channel and disposed on the rotary shaft, the magnetic shield having a magnetic shield flow channel that guides the coolant at the rotary shaft liquid hole to the stator winding.

7. The motor system according to claim 6, wherein
  the magnetic shield flow channel comprises: a magnetic shield first flow channel and a magnetic shield second flow channel, the magnetic shield first flow channel in communication with the rotary shaft flow channel, the rotor core having a rotor flow channel, the rotor flow channel in communication with the magnetic shield first flow channel, an opening at a first end of the magnetic shield second flow channel in communication with the rotor flow channel, and an opening at a second end of the magnetic shield second flow channel facing the stator winding, and
  the rotor flow path at least comprises: the rotary shaft flow channel, the magnetic shield first flow channel, the rotor flow channel, and the magnetic shield second flow channel.

8. The motor system according to claim 1, wherein when the motor operates in a low load or a low rotational speed, the valve is closed; and when the motor operates at a high load or a high rotational speed, the valve is intermittently opened.

9. The motor system according to claim 1, wherein an inner surface of the motor housing is recessed to form a housing flow channel mated with the stator core.

10. The motor system according to claim 9, wherein the inner surface of the motor housing comprises a liquid spraying hole in communication with the housing flow channel, the coolant in the housing flow channel is transported to the stator winding via the liquid spraying hole, and the stator flow path at least comprises the housing flow channel and the liquid spraying hole.

11. The motor system according to claim 10, wherein
the motor system further comprises: a transmission disposed at an end of the motor facing away from the motor end cap, a first end flow channel formed between the motor housing and the motor end cap, a second end flow channel formed between the motor housing and the transmission, and the first end flow channel and the second end flow channel both in communication with the housing flow channel and both in communication with the liquid spraying hole, and
the stator flow path further comprises the first end flow channel and the second end flow channel.

12. The motor system according to claim 1, further comprising: a heat exchange device in communication with the stator flow path and the rotor flow path to exchange heat with the coolant in the stator flow path and the rotor flow path.

13. The motor system according to claim 12, wherein
the motor housing comprises a motor liquid inlet hole, a heat exchange liquid inlet hole, a heat exchange liquid outlet hole, a first liquid outlet hole, and a second liquid outlet hole, the heat exchange liquid inlet hole and the heat exchange liquid outlet hole both in communication with the heat exchange device, the first liquid outlet hole and the second liquid outlet hole in communication with the heat exchange liquid outlet hole, the first liquid outlet hole in communication with the stator flow path, and the second liquid outlet hole in communication with the rotor flow path; and
the motor system further comprises: a liquid pump pumping the coolant from the motor liquid inlet hole to the heat exchange liquid inlet hole, and the coolant undergoing heat exchange in the heat exchange device before arriving at the heat exchange liquid outlet hole.

14. The motor system according to claim 12, wherein the motor housing comprises a motor water inlet, a motor water outlet, a heat exchange water inlet, and a heat exchange water outlet, the motor water inlet in communication with the heat exchange water inlet, the motor water outlet in communication with the heat exchange water outlet, the heat exchange device having a heat exchange water channel inside that is in communication with the heat exchange water inlet and the heat exchange water outlet, and the motor water inlet and the motor water outlet in communication with an external cooling circuit.

15. A vehicle comprising a motor system comprising:
a motor comprising: a motor housing, a motor end cap disposed at one end of the motor housing, a stator core, a stator winding, and a rotor core, the stator core mounted in the motor housing, the stator winding wound around the stator core, the rotor core rotatably disposed with respect to the stator core, a rotor flow path formed at least in the rotor core and configured to transport coolant to the stator winding, a stator flow path disposed in the motor and configured to transport the coolant to the stator winding, the motor end cap comprising a patch panel, the patch panel comprising a terminal, the patch panel having a patch panel liquid inlet hole, a patch panel liquid outlet hole and a patch panel flow channel communicating the patch panel liquid inlet hole with the patch panel liquid outlet hole, and the patch panel liquid inlet hole in communication with the stator flow path; and
a valve configured to control a flow of the rotor flow path.

16. The vehicle according to claim 15, wherein the valve is disposed on the motor and on the rotor flow path.

17. The vehicle according to claim 16, further comprising: a transmission disposed at one end of the motor, the transmission having a first branch flow channel, the valve disposed on the first branch flow channel, a valve liquid inlet hole of the valve in communication with the first branch flow channel, a valve liquid outlet hole of the valve in communication with the rotor flow path, and the valve liquid outlet hole in communication with the valve liquid inlet hole.

18. The vehicle according to claim 17, wherein the transmission comprises: a transmission case, a transmission main shaft, and a transmission bearing, an inner ring of the transmission bearing mounted on the transmission main shaft, an outer ring of the transmission bearing mounted in the transmission case, and a second branch flow channel in communication with the transmission bearing in the transmission.

* * * * *